Nov. 10, 1959 O. D. GRANDSTAFF ET AL 2,912,503
ELECTRONIC CONFERENCE CIRCUIT
Filed Sept. 5, 1956
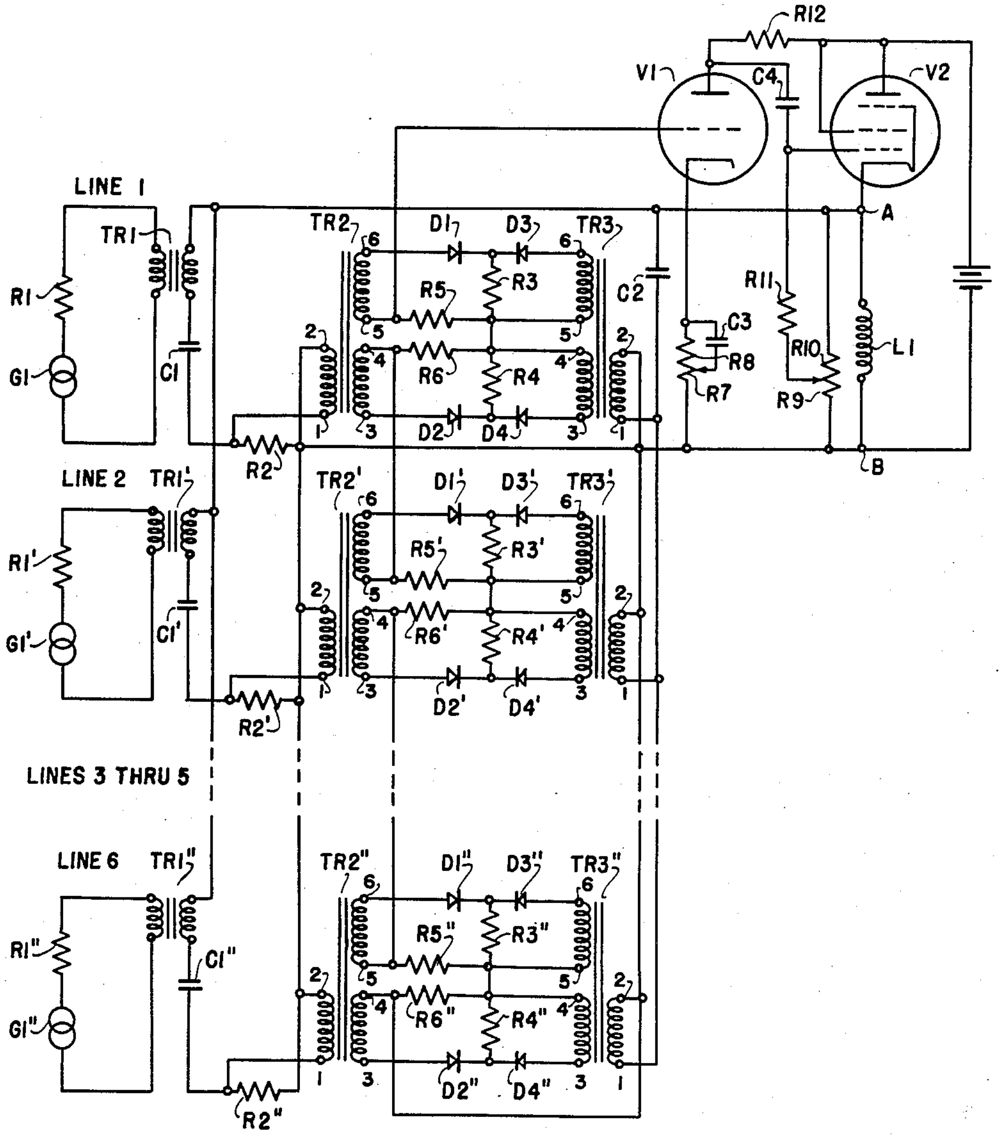
INVENTORS
OTHO D. GRANDSTAFF
DOUGLAS J. SUDA
BY Wm. Walter Owen
ATTY.

2,912,503
Patented Nov. 10, 1959

2,912,503

ELECTRONIC CONFERENCE CIRCUIT

Otho D. Grandstaff, Oak Park, and Douglas J. Suda, Cicero, Ill., assignors to General Telephone Laboratories, Incorporated, a corporation of Delaware Application September 5, 1956, Serial No. 608,132

14 Claims. (Cl. 179—1)

The present invention relates in general to telephone systems and is more particularly concerned with improvements in conference circuits in such systems.

A conference circuit is an arrangement whereby three or more persons may hold a conference over a corresponding number of telephones. This type of service has particularly wide application in P.B.X and P.A.X telephone systems where it is desirable to have a group of persons in conference with each other, either for a toll or a local call.

In the past, various schemes have been devised for use in conference networks. One example of such schemes has been variations of the normal party line connections or of a single line connection with extension phones. The main disadvantage with these types of conference arrangements is that all of the available power from one telephone must be equally divided between the other telephones in the conference and consequently the transmission is adversely effected. Especially is this so when the lines are long and the transmission power is low such as when the signal originates as a toll call or a local call over a long local line. Where the lines are short and the transmission power is high it is possible to have perhaps as many as five telephones in conference and still have somewhat acceptable transmission. Even in this situation the transmission is well below the standard for a regular two party connection and for this reason is undesirable.

In an attempt to maintain an adequate and constant level of transmisson for conference calls, various devices have been used, such as individual voice frequency repeaters for each telephone line, the cost of which has made their use rather limited, and impedance matching transformers which, because of the cumbersome pad switching means required, has made the use of this arrangement undesirable in many instances.

The present disclosure is an electronic conference circuit which was designed to correct the above disadvantages.

The basic idea of the present conference circuit, according to one aspect thereof is very briefly this: any signal originating in any line connected to the circuit is applied to the input of an amplifier which is arranged as a cathode follower. The received signal is then sent to all of the other lines in the circuit at a constant voltage, that is, at a voltage which remains constant regardless of the number of lines connected to the circuit, due to the excellent load regulation feature of the cathode follower.

By reason of the above described operation, each line of the conference circuit receives a full strength signal regardless of the number of lines in the conference. Also, the power conditions remain constant as other lines either connect or disconnect from the circuit with no noticeable transmission change to the remtaining lines in conference.

Further features of this disclosure will become apparent by a perusal of the following specification taken in conjunction with the drawing.

The drawing illustrates the conference circuit with six lines or substations having access thereto. Although only six lines are shown, it is possible that more lines could be added by choosing a different tube or by providing for additional tubes in parallel or by providing additional power to the tubes used. It should also be pointed out that although the vacuum tubes are used with a cathode follower arrangement, the same result could be accomplished with a cathode follower-type amplifier of a different kind, for instance, one using transistors. Also an amplifier with high negative feedback would be suitable, for example.

It is also to be understood that the six substations shown are only representative of any six lines which might connect to this conference circuit. Thus, the six lines shown are not intended to be permanent. For example, the leads from the primaries of all of the repeating coils TR1, may be connected to the terminal bank of a connector, thereby making this conference circuit available to any six subscribers who dial the appropriate number.

It is at the outset to be fully understood that what is described in this application is by way of illustration only, and that various changes and alterations in the design and organization of the material herein presented may be made without deviating from the true spirit and scope thereof.

Reference will now be made specifically to the circuit illustrated in the drawing.

Tube V2 is arranged as a conventional cathode follower except for the choke coil L1, which is used as the load instead of the more usual resistor or transformer. The choke coil is used in order to provide a maximum flow of direct current through the tube V2. This becomes necessary due to the fact that an ordinary 50 volt exchange battery is ordinarily used and this results in a rather low plate voltage. L1, being a choke coil, causes a high impedance to the flow of alternating current. This will be further discussed later in the specification.

Resistors 9 and 10 are bridged across L1, and serve to provide the correct grid-bias voltage for tube V2. This voltage is applied to the control grid of tube V2 through resistor R11.

Tube V1 is a standard voltage amplifier, the characteristics of which are well-known. The only unconventional feature of the circuit for tube V1 is the potentiometer R7 which is used to control the gain of tube V1 by means of controlled cathode degeneration or feedback. The adjustment of this potentiometer will subsequently be considered.

As shown in the drawing, all of the lines of the conference circuit have identical circuit networks and all lines are connected by way of their respective coupling transformers TR1, TR1′ etc., in parallel across choke L1 of cathode follower tube V2, i.e., across the terminals of the conference circuit identified by numerals A, B. As will become readily apparent hereinafter, this arrangement has the effect that the impedance of the conference circuit as "seen" from each talking line connected thereto, always appears the same.

The circuit elements G1 and R1 are standard representations for a signal source which, in this case, is the source of a voice current which originates at a substation, and for a resistance which, in this case, represents the internal resistance of the substation circuit.

As is well known, the condition for maximum power transfer between an alternating current generator and a load is that the load impedance be equal to the internal impedance of the generator. In the case of voice signals transmitted from line 1, for example, and assuming for a moment that the turns ratio of coupling transformer TR1 is unity, this condition would be met if the impedance across terminals A, B as seen from line 1 were equal to R1. Thus, if the impedance R1 of the talking line has the typical value of 600 ohms, then for maximum power transfer the impedance across conference circuit A, B into which this line is looking should be its "matching" impedance, that is, 600 ohms.

This condition would be met, of course, if the talking line, line 1 in the above example, were terminated by a single line of the same characteristics, to the same characteristics, to the exclusion of any other load. The arrangement shown in the drawing simulates this ideal condition at all times regardless of the actual load on the conference circuit or, more particularly, regardless of the number of telephone stations that have their receiver off the hook for receiving the voice signal transmitted from line 1. This is accomplished by adjusting the gain of the amplifier V1, V2, in the instant case by means of potentiometer R7, so that this amplifier, under the control of the voice signal transmitted from the talking line such as line 1 and derived from a series resistance such as R2, impresses across terminals A, B a counter voltage approximately equal to the signal voltage that would exist across these terminals if the talking line were terminated in its matching impedance in lieu of the amplifier output. The equivalence of these two conditions is based on what is known as the "Compensation Theorem," see, for example, "Communication Engineering," book by W. L. Everitt, McGraw-Hill, 1937, page 56.

As the output of a cathode follower amplifier has the characteristics of a low-impedance alternating current generator, the signal voltage impressed thereby on the conference circuit, while at all times proportional to the varying input signal fed to the amplifier by the talking line, is substantially unaffected by variations in the load, that is, by the number of listening lines effectively connected by the conference circuit at any time. The result is that the talking line, in effect, sees its matching impedance at all times; furthermore, each of the listening lines, whatever their number, receives a signal of a level substantially corresponding to the signal level that would be received by any of these lines if it alone were connected to the talking line to the exclusion of any other load.

The internal impedance of the signal generator formed by amplifiers V1, V2, while relatively low as explained above, is, of course, greater than zero in practice. In order to insure good voltage regulating properties of the amplifier in spite of this limitation it is desirable to couple the individual telephone lines to the conference circuit by way of step-up transformers. For example, in the embodiment shown herein, transformer TR1, TR1' etc. have a step-up ratio of 3:1. Thus, assuming that each of the six lines has an impedance of approximately 600 ohms, the matching impedance seen by the secondary of the transformer of a talking line should be $600 \times 3^2 = 5400$ ohms and it is this impedance that amplifies V1, V2 is adjusted to simulate by means of its counter voltage. As mentioned above, the impedance of choke L1 through which direct current is supplied to the cathode of tube V2 is high, even compared with 5400 ohms, and hence has a negligible shunting effect on the voice signal supplied by this tube. The voltage developed across L1 by the output signal of V2 is impressed equally upon the secondary windings of TR1, TR1', TR1'' etc., and the tendency of any additional line coming into the conference to pull this voltage down is immediately compensated for by the action of the cathode follower.

As was indicated above, a portion of the voice signal transmitted by the talking line is applied to the grid of tube V1. The portion of the signal which is thus applied is represented by the small A.-C. voltage drop across resistor R2. This signal is then amplified and applied to the grid of tube V2. V2 then sends this signal out as the counter voltage to the line originating the signal and to the listening telephones.

At this time it should be pointed out that the current flowing through resistors R2' and R2'', from the tube V2, is 180° out of phase with the current flowing through resistor R2 of line 1 due to the input signal, that is, due to the signal transmitted from this line. By reason of this phase difference the incoming signal can be distinguished from the outgoing signal. The input signal produces a voltage across the secondary of the transformer TR2 and causes a voltage to be applied to the grid of tube V1 by means of the voltage drop across the resistors R5 and R6. The output signal from V2, being 180° out of phase with the input signal from line 1, causes a voltage to be produced across the secondaries of TR2' and TR2'' and this causes a voltage drop across R5', R6', and R5'' and R6'', the polarity of which is opposite to that of R5 and R6. As all of the resistors R5 and R6 are connected in series to the grid of V1, the voltages produced by the output signal of tube V2, being equal and opposite to the voltage produced by the input signal, would interfere with and cancel out the input signal. To prevent this, and to provide for applying only the input signal to the gird of V1, the network between transformers TR2 and TR3 is used.

When an incoming signal is impressed upon transformer TR1 of line 1, there is an A.-C. voltage drop across R2 as previously pointed out. This voltage drop is applied across the primary winding 1—2 of TR2 thereby producing a voltage in the secondary windings 3—4, and 5—6 of TR2. A signal will also be impressed upon the primary winding 1—2 of TR3 from the output of tube V2, thereby producing a voltage in the secondary windings 3—4, and 5—6 of TR3. Each transformer is constructed so that odd terminals of its windings are of like polarity. The instant that the signal is positive at terminal 2 of the primary winding 1—2 of TR2, terminals 4 and 6 of TR2 will also be positive and it can be seen that current will flow through diode D1, and resistors R3 and R5. Diode D2, blocks the flow of current through resistors R6 and R4. As previously pointed out, the output signal of tube V2 is 180° out of phase with the input signal from line 1. As a result, when terminal 2 of TR2 is positive, terminal 2 of TR3 will be negative. Thus, it can be seen that at the instant that current is flowing through D1, and resistors R3 and R5, current will also be flowing through diode D4 and resistor R4 from the voltage developed across the secondary of TR3 which voltage is positive at terminals 3 and 5. Diode D3 blocks any current flow from the secondary of TR3 through R3 at this time. Considering now the instant the signal is negative at terminal 2 of TR2 it will be noted that terminals 4 and 6 are also negative and current will flow through diode D2, and resistors R4 and R6 in series. At this time, diode D1 blocks the current flow through resistors R5 and R3. At the same time that current is flowing through D2 and resistors R4 and R6, current will also flow through D3 and resistor R3 it being remembered that terminal 2 of TR3 is now positive, thus making terminals 4 and 6 of TR3 also positive. D4 will block the flow of any current from the secondary of TR3 through R4. It is thus apparent that current flows through resistor R5 on positive half cycles and through resistor R6 on negative half cycles. Thus, a positive half cycle of signal voltage appears across resistor R5 and a negative half cycle of signal voltage appears across resistor R6. As these two resistors are in series the voltages of each will add and a voltage substantially proportional to the original signal voltage will be applied to the grid of V1.

As heretofore pointed out, it is necessary that the part of the outgoing signal voltage to the listening lines which is developed across R2′ and R2″, from the tube V2, be prevented from interfering with and cancelling out the input signal which is applied to the grid of V1 as described above. This is accomplished in the following manner. When the outgoing signal from the tube V2 flows through resistors R2′ and R2″ etc., a voltage is developed across these resistors, the polarity of which is exactly opposite to that developed across resistor R2 by the input signal. It is also to be noted that the voltage developed across the primary windings 1—2 of TR3′ and TR3″ is equal to the full voltage output of tube V2 if the small voltage drop across blocking condenser C2 is neglected, while the voltage developed across the primary windings 1—2 of TR2′ and TR2″ is much smaller than the output voltage of V2, being due only to the small voltage drop across resistors R2′ and R2″ respectively. On the positive half cycle of the outgoing signal from V2, the voltages at terminals 1 of the primary windings and 3 and 5 of the secondary windings of TR3′ and TR3″ are positive and will cause current to flow through diode D4′ and resistor R4′ and through diode D4″ and resistor R4″. Diodes D3′ and D3″ prevent any current flow through that portion of the circuit. At the same time that current is flowing through diodes D4′, D4″, etc., the voltages at terminal 2 of TR2′ and TR2″ from the output of tube V2 are also positive and are trying to drive current through diodes D2′ and D2″, respectively. This current can not flow through D2′ and back through R6′ or through D2″ and back through R6″ because the smaller voltages developed at the secondaries of TR2′ and TR2″ are unable to override the larger voltage drops across R4′ and R4″ so that diodes D2′ and D2″ are rendered non-conductive. Diodes D1′ and D1″ also prevent current from flowing through resistors R5′ and R5″ due to the negative polarity at terminal 6 of TR2′ and TR2″ at this time. It is thereby seen that on the positive half cycle of the output signal no voltage is developed across resistors R5′ and R6′ or R5″ and R6″.

It should be pointed out at this time that, although the drawings and the above description illustrate transformers TR3, TR3′ and TR3″ as having a single primary winding and double secondary windings, the circuit described would operate in the same manner if the above mentioned transformers had a single secondary winding with a center tap.

When the output signal goes negative and terminals 2, 4 and 6 of TR3′ and TR3″ are positive, current will flow through diode D3′ and resistor R3′ and through diode D3″ and resistor R3″ but current is blocked by diodes D4′ and D4″ in that portion of the circuit. The voltage developed at terminals 2, 4 and 6 of TR2′ and TR2″ tend to drive current through diodes D1′ and D1″ but again the smaller voltages at TR2′ and TR2″ are unable to override the larger voltage drops across the resistors R3′ and R3″. Diodes D2′ and D2″ prevent any current flow through resistors R6′ and R6″. It is thus apparent that on both the positive and negative half cycles of the output signal from tube V2, no voltages are developed across any of the resistors R5 or R6 associated with the listening telephones and there is no interference with the voltage applied to the grid of V1 by the input signal from the talking line.

It will be understood from the above description that in the circuit including the secondary of a coupling transformer, such as TR1, a blocking condenser, such as C1, a series resistor, such as R2 and amplifier output terminals A, B, the signal voltage developed by the amplifier across these terminals is nearly equal to, but in phase opposition with, the signal voltage appearing across the secondary of that coupling transformer. This is so because the series resistor, such as R2, is small as mentioned above, so that the voltage across this resistor is much smaller than the other two voltages just referred to (the impedance of blocking condenser C1 may be neglected).

More particularly, when a line, such as line 1, is talking, that is, transmitting a voice signal, the signal voltage across the secondary of its coupling transformer is slightly larger than the counter voltage appearing across terminals A, B; on the other hand, when such a line is listening, that is, receiving a voice signal, then the voltage across A, B (which in this instance is due to the amplified signal derived from another series resistor such as R2″) is slightly larger than the voltage across the listening line. Thus, in the first case the current through R2 is due to, and of a direction corresponding to, the voltage across the secondary of the coupling transformer and power is flowing from this secondary into the conference circuit (terminals A, B). In the second case, on the other hand, the current through R2 is due to, and of a direction corresponding to, the voltage across terminals A, B and power is flowing from these terminals into the secondary of the coupling transformer.

From this it will be seen that the phase-sensitive network (TR2, TR3, D1 to D4 and R3 to R6) of the line in question, which compares the phase of the voltage across series resistor R2 with the phase of the voltage across terminals A, B, determines in effect, whether, in the circuit traced above, current and voltage are in phase coincidence or in phase opposition, that is, whether signal power is flowing in one or the other direction. The voice signal transmitted over this circuit is impressed on the input of the amplifier depending on the result of this check.

It has been assumed throughout the above description that the input signal was originated at line 1 and that all other lines were listening. From the symmetry of the circuit it is obvious that the circuit would operate the same if any line was originating the signal and any number of other lines were listening.

If two or more lines originate signals at the same time, all of these incoming signals are impressed upon the grid of V1 in the manner above described and the listening lines will receive the combined signals at full level.

What is claimed is:

1. A circuit arrangement comprising a control network and an associated amplifier, said control network comprising a first transformer through which an incoming signal is coupled to said network, and a second transformer through which the output signal from said amplifier is coupled to said network; each of said last-mentioned transformers comprising a primary winding and a first and second secondary winding; a first circuit including said first windings of said secondaries of said first and second transformers, said first circuit being further comprised of a first and a second sub-circuit, said first sub-circuit being comprised of said first secondary of said first transformer, a first rectifier and a series resistor, and said second sub-circuit being comprised of said first secondary of said second transformer, a second rectifier and a resistor common to both of said first and second sub-circuits; a second circuit including said second windings of said secondaries of said first and second transformers and having a first and second sub-circuit, said sub-circuits being comprised of similar circuit elements as in said first circuit; both of said first and second circuits being interconnected so that one of said series resistors from each of said first and second circuits are connected in series to the input circuit of said amplifier, said incoming signal to said network, by means of said first transformer, being coupled to the input circuit of said amplifier, the rectifiers of said first circuit being poled so as to allow current to flow within that circuit only during one polarity of said incoming signal, thereby causing that portion of the signal to be directed to the input circuit of said amplifier, the rectifiers of said second circuit being poled so as to allow current to flow within that circuit only during the other polarity of said incoming signal, thereby causing the latter portion of said signal to be directed to the input circuit of said amplifier.

2. A circuit arrangement comprising a plurality of lines, means for interconnecting said lines for intercommunication, an amplifier common to all of said lines and responsive to control signals from said lines, an output circuit for said amplifier, a plurality of phase sensitive networks connected between said lines and said output circuit and each being individual to one of said lines, said phase sensitive networks being comprised of two sub-circuits, each sub-circuit having means for passing to said amplifier one-half of each cycle of any signal transmitted from any of said plurality of lines, the output signal from said amplifier being transmitted to all of said plurality of lines by means of said output circuit.

3. In a communication system, a two-way communication line, an amplifier in circuit connection with said line for amplifying alternating current signals transmitted thereover, and apparatus for controlling the impression of said signals on the amplifier input depending on the direction in which signal power is flowing over said line, said apparatus comprising means for detecting the phase of the signal current flowing over said line at any instant, means for detecting the phase of the signal voltage across the line at said instant, and means for determining whether said current and voltage are in substantial phase coincidence or in substantial phase opposition.

4. In a communication system, a two-way communication line, an amplifier in circuit connection with said line for amplifying alternating current signals transmitted thereover, and apparatus for controlling the impression of said signals on the amplifier input depending on the direction in which signal power is flowing over said line, said apparatus comprising a resistance serially inserted in said line, means for detecting the phase of the signal voltage appearing across said resistance at any instant, means for detecting the phase of the signal voltage appearing across the line at said instant, and means for determining whether said two voltages are in substantial phase coincidence or in substantial phase opposition.

5. In a telephone system, a two-way telephone line, an amplifier for amplifying voice-frequency signals transmitted over said line, and apparatus interposed between said line and the input of said amplifier for controlling the impression of said signals on the amplifier input in accordance with the direction in which signal power is flowing over the line, said apparatus comprising means for deriving from said line a first voltage substantially in phase with the signal current flowing over said line and a second voltage substantially in phase with the signal voltage across said line, and a network for comparing the phases of said first and second voltages, said network being effective to gate one of said two voltages through to the input of the amplifier depending on whether said two voltages are in substantial phase coincidence or in substantial phase opposition.

6. In a telephone system, the combination as claimed in claim 5, wherein there are provided first rectifier means for separating the positive portion from the negative portion of said first voltage and second rectifier means for separating the positive portion from the negative portion of said second voltage and circuit connections for thereafter reassembling the positive and negative signal portions for impression on the input of said amplifier.

7. In a telephone system, the combination as claimed in claim 5, wherein the circuit components are chosen so that the second voltage is larger than the first voltage, whereby the second voltage, when in phase coincidence with said first voltage, renders said first rectifier means nonconductive, thereby substantially preventing current flow over said circuit connection.

8. A communication system comprising a plurality of interconnected two-way telephone lines, an amplifier common to said lines and having its output bridged across the junction of said lines, there being individually connected between each said line and the input of said amplifier a phase-sensitive network for detecting the direction of signal power flow between the corresponding line and said junction, each said network being effective, to permit signals transmitted over the corresponding line to be impressed on said input only if signal power is flowing from the corresponding line into said junction but not if said power is flowing in the opposite direction.

9. A telephone system comprising a plurality of two-way telephone lines, a connecting line interconnecting said telephone lines, an amplifier common to said telephone lines and having its output bridged across said connecting line, and a plurality of phase-sensitive apparatus each individually interposed between the corresponding telephone line and the input of said amplifier; each said apparatus including impedance means serially inserted in the corresponding telephone line for supplying a signal voltage corresponding to the voice signal transmitted over said line in either direction, rectifier means connected to the corresponding impedance means for separating the positive portion from the negative portion of the corresponding signal voltage, thereby to distinguish signal voltages due to voice-signal-transmitting telephone lines from signal voltages due to voice-signal-receiving telephone lines, and circuit connections to said rectifier means for thereafter reassembling the positive and negative signal voltage portions for impression on the input of said amplifier.

10. A telephone system comprising a plurality of interconnected two-way telephone lines of approximately the same impedance, an amplifier having its output connected across the junction of said telephone lines, means for impressing on the input of said amplifier a signal voltage due to a voice-signal-transmitting one of said telephone lines, said amplifier including gain adjusting means set so that the amplifier output impresses across said junction a signal voltage approximately equal to the signal voltage that would exist thereacross if the voice-signal-transmitting telephone line were terminated in its matching impedance in lieu of said amplifier output.

11. A telephone system as claimed in claim 10, wherein said amplifier is of a type whose output constitutes a voltage source of low internal impedance, whereby said amplifier output acts to simulate said matching impedance regardless of how many signal-receiving telephone lines are effectively connected to said connecting line.

12. A telephone system comprising a plurality of two-way telephone lines each having a predetermined impedance, a connecting line, a plurality of transformers each coupling the corresponding telephone line to said connecting line, an amplifier having its output connected across said connecting line, means impressing on the input of said amplifier a signal voltage due only to a voice-signal-transmitting one of said telephone lines, said amplifier including gain adjusting means set so that the amplifier output impresses across said connecting line a signal voltage approximately equal to the signal voltage that would exist if the connecting-line side of said transformer were terminated, in lieu of said amplifier output, by an impedance equal to that of the transmitting line times the square of the turns ratio of the corresponding transformer.

13. A conference system comprising a plurality of telephone stations, a conference line, a plurality of telephone lines each connecting the corresponding station with said conference line, and an amplifier of the cathode-follower type, means for impressing on the input of said amplifier a signal voltage due to a voice signal transmitted from one or more of said stations over the corresponding telephone line, the output of said cathode-follower type amplifier being connected across said conference line so that the signal voltage across the conference line remains substantially unchanged regardless of the number of stations that are at any time effectively connected across said conference line for voice signal reception.

14. A conference system as claimed in claim 13, wherein said amplifier includes a driver stage employing variable cathode-regeneration means so that said amplifier may be set to impress across the conference line, regardless of the number of signal-receiving stations effectively connected thereto, a signal voltage approximately equal to the signal voltage that would exist thereacross if the voice-signal-transmitting telephone line were terminated in its matching impedance in lieu of the amplifier output.

References Cited in the file of this patent

UNITED STATES PATENTS

| | | |
|---|---|---|
| 2,279,660 | Crosby | Apr. 14, 1942 |
| 2,523,671 | Vincent | Sept. 26, 1950 |